US009306692B2

(12) United States Patent
Rabinovich

(10) Patent No.: US 9,306,692 B2
(45) Date of Patent: Apr. 5, 2016

(54) METHOD AND DEVICE FOR ASSESSING THE PERFORMANCE OF ONE OR MORE PACKET SYNCHRONIZATION SERVICES IN A PACKET DATA TRANSMISSION NETWORK

(71) Applicant: ADVA Optical Networking SE, Meiningen (DE)

(72) Inventor: Michael Rabinovich, Modiin (IL)

(73) Assignee: ADVA Optical Networking SE, Meiningen (DE)

( * ) Notice: Subject to any disclaimer, the term of this patent is extended or adjusted under 35 U.S.C. 154(b) by 13 days.

(21) Appl. No.: 14/066,476

(22) Filed: Oct. 29, 2013

(65) Prior Publication Data

US 2014/0119390 A1    May 1, 2014

(30) Foreign Application Priority Data

Oct. 29, 2012   (EP) ..................................... 12007402

(51) Int. Cl.
*H04J 3/06* (2006.01)
*H04L 12/26* (2006.01)
*H04N 21/242* (2011.01)

(52) U.S. Cl.
CPC ............. *H04J 3/0658* (2013.01); *H04J 3/0635* (2013.01); *H04J 3/0638* (2013.01); *H04J 3/0667* (2013.01); *H04L 43/0852* (2013.01); *H04N 21/242* (2013.01); *H04L 43/106* (2013.01)

(58) Field of Classification Search
None
See application file for complete search history.

(56) References Cited

U.S. PATENT DOCUMENTS

| 2004/0151127 | A1  | 8/2004  | Chong |
| 2006/0153174 | A1* | 7/2006  | Towns-von Stauber et al. ............................ 370/356 |
| 2009/0196277 | A1  | 8/2009  | Horn et al. |
| 2013/0315265 | A1* | 11/2013 | Webb et al. .................. 370/516 |

FOREIGN PATENT DOCUMENTS

| WO | 2010066664 A1 | 6/2010 |
| WO | 2011060965 A1 | 5/2011 |

OTHER PUBLICATIONS

T. Laine, New Synchronization Metrics for Packet Networks, PhD Thesis, Aug. 16, 2010, pp. 1-92.*

(Continued)

*Primary Examiner* — Christopher Crutchfield
(74) *Attorney, Agent, or Firm* — The Culbertson Group, P.C.

(57) ABSTRACT

A method for assessing the performance of packet synchronization services in a packet data transmission network. The method includes, at a packet data transmission network probing point, determining at least two synchronization quality describing or influencing parameters based on at least one of a digital timing signal (Sp) received, the recovered time information for at least one timing parameter transmitted into the packet data transmission network, and parameters having impact on the synchronization quality and describing or controlling properties of hardware components present at a receiving network node. The method also includes, at the packet data transmission network probing point, determining a value of at least one synchronization performance score based on the at least two synchronization quality describing or influencing parameters.

18 Claims, 2 Drawing Sheets

(56) References Cited

OTHER PUBLICATIONS

O. Rohen, Synchronization Monitoring in IEEE 1588 Synchronization Networks, Proceedings of the 2013 International IEEE Symposium on Precision Clock Synchronization for Measurement Control and Communication, Sep. 27, 2013, pp. 95-100.*

Q. Mei, H. Jan-Gui, Implementation of Synchronization Measurement in Warship Power Monitoring and Control System Based on IEEE 1588, proceedings of The 2010 International Conference on Electrical and Control Engineering, 2010, pp. 2797-2088.*

M. Lixia, IEEE 1588 Synchronization in Distributed Measurement Systems for Electric Power Networks, PhD Thesis, Mar. 2012, pp. 1-132.*

A. Reibman, S. Sen, J. Van der Merwe, Network Monitoring for Video Quality over IP, Proceedings of the Picture Coding Symposium, Dec. 2004, pp. 1-6.*

EP, Extended European Search Report, for EP Application No. 12007402.6 dated Mar. 22, 2013 (7 pages).

"Methods for subjective determination of transmission quality," ITU-T, Aug. 1996, p. 800 (37 pages).

"Packet delay variation network limits applicable to packet-based methods," ITU-T, Feb. 2012, G.8261.1 (18 pages).

* cited by examiner

METHOD AND DEVICE FOR ASSESSING THE PERFORMANCE OF ONE OR MORE PACKET SYNCHRONIZATION SERVICES IN A PACKET DATA TRANSMISSION NETWORK

TECHNICAL FIELD OF THE INVENTION

The invention relates to a method and a device for assessing the performance of one or more packet synchronization services in a packet data transmission network.

BACKGROUND OF THE INVENTION

In recent years broadband services like broadcast TV, video on demand (VoD) or mobile Internet play an increasingly important role. In order to obtain a lower cost-per-bit-effective transport of the signals to be transported, a new generation packet network technology has been developed, which requires new methods for transferring time information. It shall be noted that, throughout this description, the term "time information" refers to information concerning the absolute or relative time and information concerning frequency and phase of a timing signal. Many of these new time information transfer methods are not at the physical layer, but involve the network and data link layers and are thus affected by the packet network behavior. In order to characterize the packet network behavior, suitable instrumentation and analysis techniques for characterizing packet latency and packet delay variation have been developed.

Packet synchronization services have been evolving services during the last few years, fueled by massive rollout of advanced mobile networks.

A widely used possibility for distributing timing information over a packet-based network is the synchronous Ethernet protocol (syncE) which provides synchronization (frequency synchronization) on the physical ethernet layer.

Additionally, other protocols for transferring precision time information over a packet network on higher layers have been developed, among others, the Network Time Protocol (NTP) and Precision Time Protocol (PTP) as defined in IEEE 1588v2. Systems for realizing high-performance time information transfer using these protocols include components for precision packet timing measurements, especially a common precision primary clock reference from a source (such as a PTP master clock) and hardware having timestamping capability. Such equipment has been developed over the last several years and makes it possible to perform packet delay measurements in the laboratory and in operating networks.

A plurality of metrics have been proposed for assessing the stability and quality of packet based time information. Especially, the Time Interval Error (TIE), Maximum Time Interval Error (MTIE), Minimum Time Deviation (minTDEV), Maximum Average Time Interval Error (MATIE) and Maximum Average Frequency Error (MAFE) are, among others, useful metrics to assess the stability and quality of packet-based time and frequency information. Like all metrics proposed for packet synchronization services assessment, these metrics imply the measurement of recovered clock performance data or specific transport attributes of the packet network and the comparison of the results obtained with predefined target performance masks.

The interpretation and analysis of such packet timing data still is a rather challenging task as a certain level of knowledge and understanding of the measurement results is required. Further, a precise synchronization reference is required for the measurements, which is not always available at the network node at which the synchronization service quality is to be assessed. Lastly, these methods are more suitable for the synchronization services diagnostics and less fit performance monitoring needs.

For assessing the quality of a given service, the use of scores is known in a variety of technical fields. For example, the mean opinion score (MOS) is used in telephony networks. MOS is specified by ITU-T P.800 "Methods for subjective determination of transmission quality". Further, US 2004/0151127 A1 discloses a method and a system for calculating both transmission impairment test (TIT) scores and quality of service (QoS) scores for signal transmissions over a communications network.

SUMMARY OF THE INVENTION

It is an object of the present invention to provide a method and device for assessing the performance of one or more packet synchronization services in a packet data transmission network that can easily be realized and is suitable for monitoring services and that delivers results which do not require a deep understanding of complex measurement methods.

Embodiments of the invention provide a simple, clear and unified method of packet synchronization services performance assessment and presentation by using a method of assigning performance scores. The calculation of the performance score values is effected by using at least two synchronization quality describing or influencing parameters based on at least one of the digital timing signals received, the recovered time information for the at least one timing parameter and parameters having impact on the synchronization quality and describing or controlling properties of hardware components present at the receiving network node. Two or more parameters influencing or describing the quality of a synchronization service are collectively used to determine a score value. Thus, assessing and monitoring the quality of the respective synchronization service becomes faster and easier. Moreover, assessing the synchronization service quality does not require a deep understanding of measurement techniques or influences of the respective parameters on the synchronization services quality. The invention is applicable on practically all synchronization methods that distribute timing information (hereinafter referred to as "time information") irrespective of the fact which network layer or protocol level is used to distribute the time information and which time information (absolute or relative time, frequency, phase) is distributed over the network in order to effect the respective (time, frequency or phase) synchronization. The digital timing signal used for distributing the time information may also be a packet-based signal.

A predefined scoring scale covering a given range of values may be used for assigning the scoring values, e.g. a given range of integer values or a given range of decimal values. As an example, the scoring scale may comprise five integer values, e.g. the integer values in the range from 1 to 5, the score value 5 indicating assured performance, the score value 4 indicating satisfied performance, the score value 3 indicating degraded performance, the score value 2 indicating bad performance and the score value 1 indicating service unavailability. One or more additional decimal places may be used to provide better granularity.

Within the framework provided by the invention, the method of score assignment may depend on implementation and may be defined by the user taking into account specific monitoring needs and synchronization reference availability at the respective data transmission network probing point at which the assessment or monitoring of the synchronization services quality shall be effected. The probing point may be at a receiving network node or at a transport node of the transport network or at any probing position within the transport network granting access to at least the digital timing signal including the central time information for at least one of the timing parameters absolute time, relative time, frequency and phase.

Of course, not all types of synchronization quality describing or influencing parameters must be available at the respective probing point. For example, if no synchronization reference is available at the probing point, synchronization quality describing or influencing parameters based on time interval errors (TIE) are not available, so the determination of the score value for the respective synchronization service quality is to be based on other parameters that are available at the probing point.

According to an embodiment of the invention, the synchronization quality describing or influencing parameters may include
- packet delay variation metrics, for example time deviation (TDEV), minimum time deviation (minTDEV), maximum average frequency error (MAFE), minimum maximum average frequency error (minMAFE),
- algorithm data obtained from an algorithm for determining the recovered time information;
- network limits evaluation parameters, e.g. based on ITU-T G.8261.1;
- packet loss rate,
- maximum time interval error (MTIE) with respect to a synchronization reference present at the probing point,
- measured fractional frequency offset (FFO) or measured phase offset with respect to a synchronization reference present at the probing point,
- detected load steps,
- parameters describing the recovery performance of the timing information, e.g. clock recovery,
- parameters describing or controlling properties of hardware components present at the receiving network node, such as the temperature variation of a temperature controlled synchronization reference.

The value of the at least one synchronization performance score may be determined by using a predetermined scoring table defining a dependency between given values for the at least one type of synchronization performance score and the at least two scoring parameters (parameters which describe or influence the quality of a synchronization service), and/or by using an analytical function using the at least two scoring parameters as input parameters or a combination thereof. Here, the term "table" includes any representation of values or ranges of values for the synchronization quality describing or influencing parameters and the scoring values. The table may be stored in a dedicated storage of a suitable device, as may be the case for the analytical function and/or parameters of the function. The table or function may be configured as a two- or more-dimensional table or function, i.e. the value of the score can be directly calculated using the respective parameter values or information. According to another alternative, the score values can be calculated by a set of one-dimensional tables or functions, each table or function yielding a preliminary scoring value depending on a single parameter or kind of information, only. The preliminary scoring values may then be combined by calculating a weighted average value or any other suitable method. The measured or calculated parameter values used for determining the synchronization performance score values may also be average values covering a given time interval.

According to a further embodiment of the invention, the at least one synchronization performance score is chosen from a group of synchronization performance score types including the types of network usability score in forward direction from the central time information distribution node to the receiving network node, network usability score in reverse direction from the receiving network node to the central time information distribution node, absolute or relative time recovery score, clock recovery score, frequency recovery score and phase recovery score.

Determining a value of the network usability score in the forward direction and/or the network usability score in the reverse direction is based on at least two synchronization quality describing or influencing parameters of the group including:
- Network limits evaluation parameters, e.g. based on ITU-T G.8261.1; here, an evaluation of minimum packet delay variation (PDV) of 1% of precision time protocol (PTP) event packets during observation window of 200 seconds may be effected;
- Packet delay variation metrics, for example time deviation (TDEV), minimum time deviation (minTDEV), maximum average frequency error (MAFE), minimum maximum average frequency error (minMAFE);
- Packet loss rate.

The determination of a value of the frequency recovery score may be based on at least two synchronization quality describing or influencing parameters of the group including:
- network limits evaluation parameters, e.g. based on ITU-T G.8261.1, packet delay variation metrics, for example time deviation (TDEV), minimum time deviation (minTDEV), maximum average frequency error (MAFE), minimum maximum average frequency error (minMAFE), and packet loss rate;
- detected load steps
- parameters describing or controlling properties of hardware components present at the receiving network node, such as the temperature variation of a temperature-controlled synchronization reference.
- maximum time interval error (MTIE) with respect to a synchronization reference present at the probing point,
- measured fractional frequency offset (FFO) or measured phase offset with respect to a synchronization reference present at the probing point.

Determining a value of the phase recovery score can be based on at least two synchronization quality describing or influencing parameters of the group including
- measured phase offset with respect to a phase synchronization reference present at the probing point,
- maximum time interval error (MTIE) with respect to a synchronization reference present at the probing point,
- clock recovery performance.

According to a further embodiment of the method, one or more values of one type of a synchronization performance score can be used to determine the value of another type of a synchronization performance score, preferably in combination with values of other synchronization quality describing or influencing parameters.

Further, a general synchronization score value may be determined based on one or more values of two or more different types of scores for assessing the quality of two or more synchronization services.

According to a preferred embodiment, the value of the at least one synchronization performance score is determined on request or at a predetermined point in time or periodically with a given periodicity.

The determined values of the at least one synchronization performance score can be stored and/or displayed for a given current time interval or given past time intervals. Displaying may be effected in the form of a table, graph or statistics.

Also, an error signal may be created if the current value does not match a predetermined criterion or if a more complex analysis of two or more values of the at least one synchronization performance score does not match a predetermined criterion.

These and other advantages and features of the invention will be apparent from the following description of illustrative embodiments, considered along with the accompanying drawings.

BRIEF DESCRIPTION OF THE DRAWINGS

In the following, the invention is explained in greater detail with respect to an embodiment shown in the drawing, in which.

DESCRIPTION OF ILLUSTRATIVE EMBODIMENTS

Figure 1:
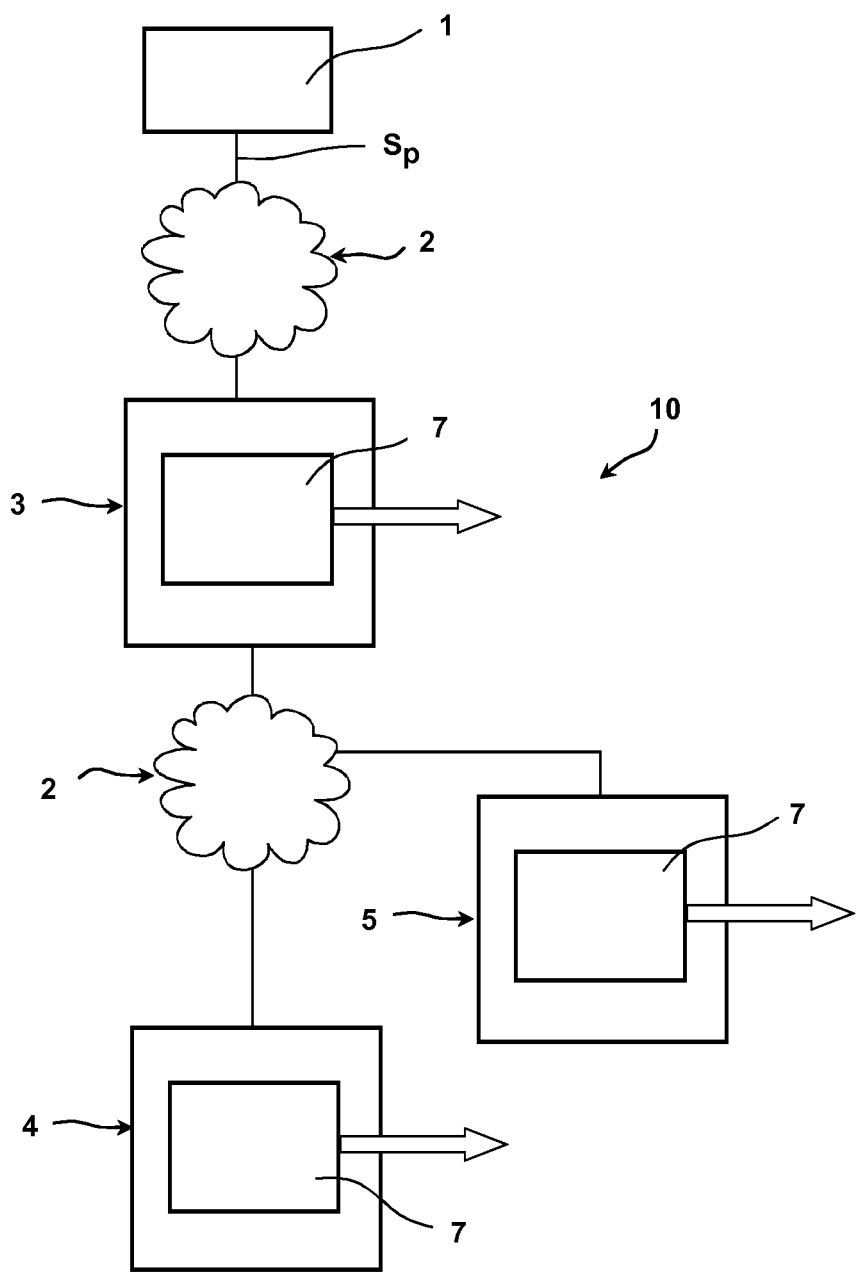
FIG. 1 shows a schematic diagram of a packet data transmission network illustrating various possibilities of probing points at which the method or the device according to the invention may be applied.

FIG. 1 shows a schematic block diagram of a packet data transmission network 10 including a transport network 2 which may include at least one transport node 3. Generally, larger networks include a plurality of transport nodes 3, which can be realized by routers, switches etc. At a central time information distribution node 1 a digital timing signal $S_p$ including a central time information for at least one of the timing parameters absolute time, relative time, frequency and phase is transmitted into the transport network 2. The digital timing signal $S_p$ may be a packet signal transporting timestamps in case of NTP or PTP or a specific digital signal having a predefined pattern transporting a frequency information in case of synchronous Ethernet. Finally, the network 10 includes at least one, usually a plurality, of receiving nodes 4 at which the digital timing signal including the central time information is received and processed in order to synchronize the timing at the receiving node and the time information at the central time information distribution node 1. This information can, for example, be used to effect a clock recovery so that one or more signals created at the receiving node are transmitted according to a prescribed timing pattern. In mobile communication networks, the time information is also used to switch the communication channels established from the presently active cell to the next cell.

As shown in FIG. 1, the transport node 3 and the receiving node 4 comprise, among other components of no importance to the present invention and therefore not shown, a device 7 for assessing the performance of one or more packet synchronization services. The device 7 may also be included by a transport node 3 or even be used within a probing equipment or at a probing node 5 at which the quality of the synchronization services rendered within the network 10 can be assessed. At any rate, device 7 outputs values of at least one synchronization performance score. The output may be effected in the form of direct currently determined values, historical values, or a combination thereof. The output data may, of course, be visualized by means of a display or transmitted to a further evaluation or storage device. Further, as already known, the device 7 may also output information for measured values of synchronization quality describing or influencing parameters, e.g. network metrics or clock performance metrics and statistics (see FIG. 2).

Figure 2:
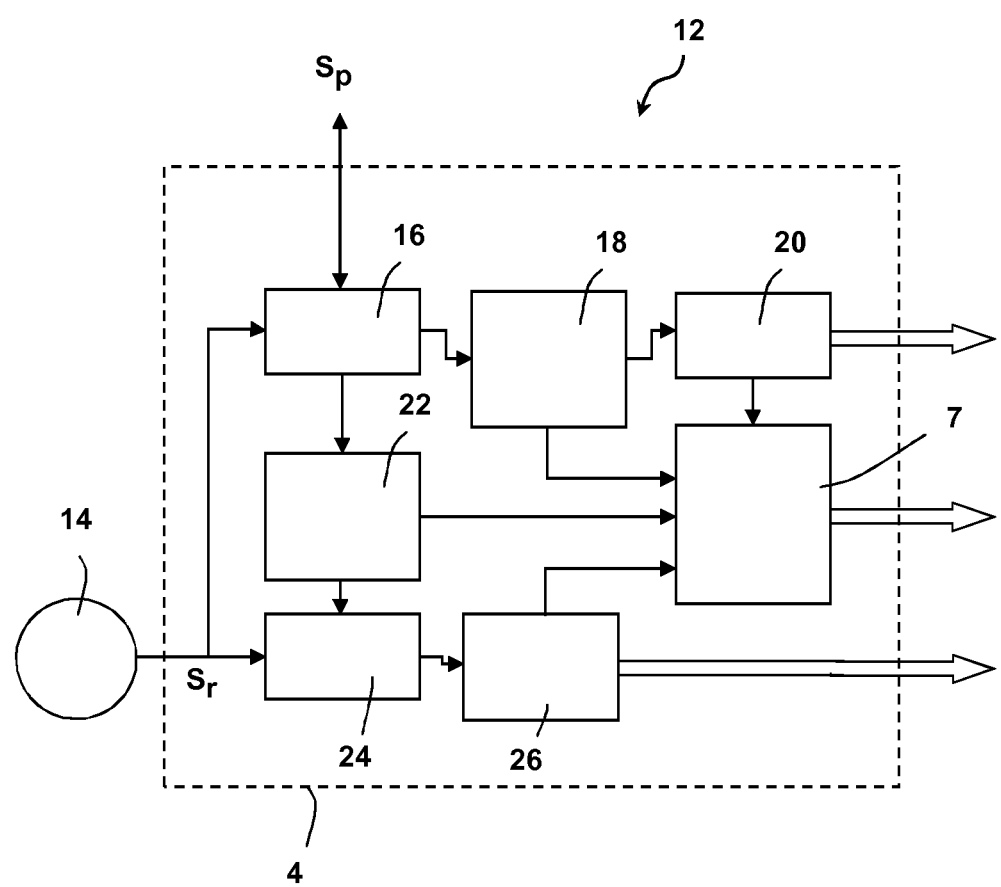
FIG. 2 shows a schematic block diagram of a device for processing (including the recovery) of the time information transmitted by a central time information distribution node including a device according to the invention for assessing the performance of one or more packet synchronization services in a packet data transmission network using the precision time protocol.

FIG. 2 shows a schematic block diagram of a device 12 for processing (including the recovery) the time information transmitted by a central time information distribution node 1 including a device 7 according to the invention for assessing the performance of one or more packet synchronization services in the transmission network 10 using the precision time protocol (PTP) as specified in IEEE 1588. In this case, the central time information distribution node 1 is realized as a PTP master clock. The device 12 may be part of a receiving node 4 hardware, further components of which are not shown in FIG. 2 for reasons of simplicity.

The device 12 may, in terms of the IEEE 1588 terminology, be designated and realized as ordinary slave clock (OC-S). As the general function of an OC-S is well known by an expert in this field, it will only be briefly discussed in as far as it is useful for understanding the invention.

The OC-S 12 recovers the time information received via the time information distributed by the PTP Master from the packet data signal $S_p$. The signal $S_p$ is supplied to a timestamp recording unit 16 which additionally receives a reference signal $S_r$ output by a synchronization reference unit 14. The reference signal $S_r$ enables the timestamp recording unit to carry out the handshake between the PTP master 1 and the OC-S 12 in order to obtain the time information necessary for calculating the packet delay. The calculation of the packet delay is carried out by the packet delay calculation unit 18 which receives the necessary data from the timestamp recording unit 16. The packet delay data are supplied to a packet delay metrics calculation unit 20, which uses the data received for calculating packet delay based metrics, such as minTDEV, MAFE etc. These metrics are provided for further purposes, especially for manually assessing the respective quality of the digital timing signal received.

The timestamp recording unit 16 further supplies the time information to a clock recovery unit 22 used to recover the frequency and phase from the packet time information obtained from the PTP master 1. A TIE measurement unit 24 is used to measure time interval errors of the frequency and/or phase signals created by the clock recovery unit 22. For these measurements, the TIE measurement unit 22 compares the recovered frequency and/or phase signals with the reference signal $S_r$ supplied by the synchronization reference unit 14.

A clock metrics calculation unit 26 calculates metrics describing the accuracy of the phase and/or frequency, such as MTIE, TDEV, etc. and maintains statistics of fractional frequency offset (FFO), phase error, etc. Also these metrics and statistics are provided for further purposes, especially for manually assessing the respective quality of the recovered time information, especially the quality of the recovered clock signal or information with respect to its frequency and phase.

The device 7 for assessing the performance of one or more packet synchronization services, which may also be referred to as performance scores estimation unit, receives, as synchronization quality describing or influencing input parameters, packet delay data from the packet delay calculation unit 18, accuracy data describing the digital timing signal $S_p$ from the packet delay metrics calculation unit 20, and clock accuracy data from clock metrics calculation unit 26. Additionally, the performance scores estimation unit 7 receives algorithm data $S_{al}$ from the clock recovery unit 22 describing properties and/or the accuracy of the algorithm used for recovering the frequency and phase information from the time information received via the packet data signal $S_p$.

The performance scores estimation unit 7 provides performance scores based on the input information described above. For this purpose, the unit 7 includes a table or analytical functional relationship or a combination thereof allowing to uniquely assign a specific score value for a given score type to a combination of values or ranges of values of at least two different input parameters. Thus, a value of a synchronization performance score is a measure of the quality or at least one synchronization service based on measurement and/or calculation results each of which per se would already be difficult to interpret.

The performance scores estimation unit 7 may use a predefined scoring scale covering a given range of values which are used for assigning the scoring values, e.g. a given range of integer values or a given range of decimal values. As an example, the scoring scale may comprise five integer values, e.g. the integer values in the range from 1 to 5, the score value 5 indicating assured performance, the score value 4 indicating satisfied performance, the score value 3 indicating degraded performance, the score value 2 indicating bad performance and the score value 1 indicating service unavailability. Of course, a scale covering a larger range or narrower range a may be used. Further, one or more additional decimal places may be used to provide better granularity. Instead of numerical scoring values, other indications may be assigned in order to assess the quality of the synchronization service(s), like descriptive designations "excellent", "good", "acceptable", "degraded" and "unavailable".

In case the synchronization reference 14 is not available at the probing point, as is the case for the probing node 5 or the transport node 3 in the network according to FIG. 1, the performance scores estimation unit 7 is unable to precisely calculate packet delay data or to measure TIE values. In this case, performance score estimation can be based on clock recovery algorithm data and on packet delay measurements done with the reference of the recovered clock.

In general, the performance scores estimation unit 7 may determine values of more than one type of synchronization performance score. For example, values of one or even two network usability scores may be used for the assessment of the synchronization quality if the time information is transmitted into the packet data transmission network 10 by means of a central time information distribution node 1, namely, a network usability score in the forward direction (from the central time information distribution node 1 to the probing point, especially the respective receiving node 4) and a network usability score in the reverse direction (from the probing point, especially the respective receiving node 4, to the central time information distribution node 1).

If the packet data transmission network 10 uses the PTP, the network usability score(s) may be determined by using a combination of the following parameters of information:
 carrying out a network limits evaluation based on ITU-T G.8261.1 and using the respective results;
 packet delay variation metrics such as minTDEV, minMAFE etc.,
 packet loss rate for the respective transmission link and direction.

A value of a frequency recovery score may be based on a combination of the following parameters or information:
 detected load steps;
 temperature variation of the synchronization reference 14 or one or more components of the synchronization reference 14, e.g. the temperature variation of an oven controlled crystal oscillator (OCXO) (if a synchronization reference unit 14 is available and MTIE measurement is provided at the probing node);
 MTIE results (if a synchronization reference unit 14 is available and MTIE measurement is provided at the probing node);
 measured fractional frequency offset results (if a synchronization reference unit 14 is available at the probing node)

Moreover, the values of one or both network usability scores may additionally be used as an information for determining a value of the frequency recovery score.

A value of a phase recovery score may be based on a combination of the following parameters or information:
 current values of the frequency and phase of a suitable reference signal received at the probing node, e.g. a GPS signal received or a synchronous Ethernet (SyncE) reference signal or any other frequency or phase reference signal;
 clock recovery performance (if the PTP is used and the clock is recovered from absolute or relative time information in the form of timestamps at the probing node);
 MTIE results (if a synchronization reference unit 14 is available and MTIE measurement is provided at the probing node);
 measured phase offset results (if a phase reference is available at the probing node).

As explained above, it is not only possible to use the result (value) of one type of synchronization performance score to determine the value of another type of synchronization performance score, but it is also possible to determine a value of one or more general synchronization performance score types that combine two or more of the ordinary types of synchronization performance scores including the following types: network usability score in forward direction from the central time information distribution node to the receiving network node; network usability score in reverse direction from the receiving network node to the central time information distribution node; absolute or relative time recovery score; clock recovery score; frequency recovery score; phase recovery score.

The score values may be determined periodically with a given periodicity depending on the specific implementation. The score results may be presented as table, graph or statistics collected for current and historical time intervals. Of course, it is also possible to create an error signal if one or more score values of one or more synchronization performance score types exceed a specified threshold.

Thus, this invention provides a unified method and a device for presenting synchronization services test results. A service operator does not need prior comprehensive knowledge of the synchronization service testing methods and experience in the analysis of the tests results.

As used herein, whether in the above description or the following claims, the terms "comprising," "including," "carrying," "having," "containing," "involving," and the like are to be understood to be open-ended, that is, to mean including but not limited to.

The above described preferred embodiments are intended to illustrate the principles of the invention, but not to limit the scope of the invention. Various other embodiments and modifications to these preferred embodiments may be made by those skilled in the art without departing from the scope of the present invention.

LIST OF REFERENCE SIGNS 1 central time information distribution node/PTP master
2 transport network
3 transport node
4 receiving node
5 probing node
7 device for assessing the performance of one or more packet synchronization services/performance scores estimation unit
10 packet data transmission network
12 device for processing the time information
14 synchronization reference unit
16 timestamp recording unit
18 packet delay calculation unit
20 packet delay metrics calculation unit
22 clock recovery unit
24 TIE measurement unit
26 clock metrics calculation unit
$S_p$ digital timing signal
$S_r$ reference signal
$S_{al}$ algorithm data

The invention claimed is:

1. A method for assessing and monitoring the performance of one or more packet synchronization services in a packet data transmission network,
the packet data transmission network comprising
(i) a transport network for receiving, from a central time information distribution node for transmitting into a transport network a digital timing signal ($S_p$) including a central time information for at least one of the timing parameters absolute time, relative time, frequency and phase, and
(ii) at least one receiving network node for receiving the digital timing signal ($S_p$) via the transport network, detecting the central time information included in the digital timing signal ($S_p$) received and using the central time information in order to synchronize the at least one timing parameter at the receiving network node and the central time information distribution node;
the method comprising the steps of:
(a) at a packet data transmission network probing point, determining at least two synchronization quality describing or influencing parameters based on at least one of the digital timing signal ($S_p$) received, the recovered time information for the at least one timing parameter and parameters having impact on the synchronization quality and describing or controlling properties of hardware components present at the receiving network node;
(b) at the packet data transmission network probing point, determining a value of at least one synchronization performance score for a given time interval based on the at least two synchronization quality describing or influencing parameters each for the same time interval, the at least one synchronization performance score each having a respective predefined scoring scale covering a given range of values; and
(c) at the packet data transmission network probing point, collecting the values of the at least one synchronization performance score for one or more given collection time intervals and storing or displaying these synchronization performance score values for monitoring purposes.

2. The method of claim 1, wherein the at least two synchronization quality describing or influencing parameters are selected from the group comprising:
(a) packet delay variation metrics from the group time deviation (TDEV), minimum time deviation (minTDEV), maximum average frequency error (MAFE), and minimum maximum average frequency error (minMAFE);
(b) algorithm data obtained from an algorithm for determining the recovered time information;
(c) network limits evaluation parameters;
(d) packet loss rate,
(e) maximum time interval error (MTIE) with respect to a synchronization reference present at the probing point,
(f) measured fractional frequency offset (FFO) or measured phase offset with respect to a synchronization reference present at the probing point,
(g) parameters describing the recovery performance of the timing information, and
(h) parameters describing or controlling properties of hardware components present at the receiving network node.

3. The method of claim 1 wherein the value of the at least one synchronization performance score is determined
(a) by using a predetermined scoring table defining a dependency between given values for the at least one synchronization performance score and the at least two synchronization quality describing or influencing parameters, or
(b) by using an analytical function using the at least two synchronization quality describing or influencing parameters as input parameters.

4. The method of claim 1, wherein the at least one synchronization performance score is chosen from a group of synchronization performance score types including the types of:
(a) network usability score in forward direction from the central time information distribution node to the receiving network node;
(b) network usability score in reverse direction from the receiving network node to the central time information distribution node;
(c) absolute or relative time recovery score;
(d) clock recovery score;
(e) frequency recovery score; and
(f) phase recovery score.

5. The method of claim 4, wherein the determination of a value of the network usability score in the forward direction or the network usability score in the reverse direction is based on at least two synchronization quality describing or influencing parameters of the group including:
(a) network limits evaluation parameters;
(b) packet delay variation metrics, including time deviation (TDEV), minimum time deviation (minTDEV), maximum average frequency error (MAFE), and minimum maximum average frequency error (minMAFE); and
(c) packet loss rate.

6. The method of claim 4, wherein the determination of a value of the frequency recovery score is based on at least two synchronization quality describing or influencing parameters of the group including
(a) the synchronization quality describing or influencing parameters of the group including (i) network limits evaluation parameters, (ii) packet delay variation metrics, including time deviation (TDEV), minimum time deviation (minTDEV), maximum average frequency error (MAFE), minimum maximum average frequency error (minMAFE), and (iii) packet loss rate, for determining the network usability score in one or both directions,
(b) parameters describing or controlling properties of hardware components present at the receiving network node, including the temperature variation of a temperature controlled synchronization reference,
(c) maximum time interval error (MTIE) with respect to a synchronization reference present at the probing point, and
(d) measured fractional frequency offset (FFO) or measured phase offset with respect to a synchronization reference present at the probing point.

7. Method according to claim 4, wherein the determination of a value of the phase recovery score is based on at least two synchronization quality describing or influencing parameters of the group including
(a) measured phase offset with respect to a phase synchronization reference present at the probing point,
(b) maximum time interval error (MTIE) with respect to a synchronization reference present at the probing point, and
(c) clock recovery performance.

8. The method of claim 4, wherein one or more values of one type of a synchronization performance score are used to determine the value of another type of a synchronization performance score.

9. The method of claim 1, wherein a general synchronization score value is determined based on one or more values of two or more different types of scores.

10. The method of claim 1, wherein the value of the at least one synchronization performance score is determined on request or at a predetermined point in time or periodically.

11. The method of claim 1, wherein values of the at least one synchronization performance score are displayed in the form of a table, a graph representing a curve of the values as depending on the time, or a graph representing a statistical representation of the values or results obtained from processing the values.

12. The method of claim 1, wherein a failure notification alert is created if the current value does not match a predetermined criterion or if a more complex analysis of two or more values of the at least one synchronization performance score does not match a predetermined criterion.

13. A device for assessing the performance of one or more packet synchronization services in a probing node of a packet data transmission network node,
(a) the packet data transmission network comprising
(i) a transport network for receiving, from a central time information distribution node a digital timing signal including a central time information for at least one of the timing parameters absolute time, relative time, frequency and phase, and
(ii) at least one receiving network node for receiving the digital packet data signal via the transport network, detecting the central time information included in the digital packet timing signal received and using the central time information in order to synchronize the at least one timing parameter at the receiving network node and the central time information distribution node;
characterized in
(b) that the device for assessing the performance of one or more packet synchronization services is adapted
(i) to receive at least two synchronization quality describing or influencing parameters and based on at least one of the digital timing signal received, the recovered time information for the at least one timing parameter and parameters having impact on the synchronization quality and describing or controlling properties of hardware components present at the receiving network node;
(ii) to determine a value of at least one synchronization performance score for a given time interval based on the at least two synchronization quality describing or influencing parameters each for the same time interval, the at one synchronization performance scores each having a respective predefined scoring scale covering a given range of values; and
(iii) to collect values of the at least one synchronization performance score for one or more given collection time intervals and to store or display these synchronization performance score values for monitoring purposes.

14. The device according to claim 13,
wherein the at least two synchronization quality describing or influencing parameters are from the group comprising:
(a) packet delay variation metrics, including time deviation (TDEV), minimum time deviation (minTDEV), maximum average frequency error (MAFE), and minimum maximum average frequency error (minMAFE),
(b) algorithm data obtained from an algorithm for determining the recovered time information;
(c) network limits evaluation parameters;
(d) packet loss rate,
(e) maximum time interval error (MTIE) with respect to a synchronization reference present at the probing point,
(f) measured fractional frequency offset (FFO) or measured phase offset with respect to a synchronization reference present at the probing point,
(g) parameters describing the recovery performance of the timing information, e.g. clock recovery, and
(h) parameters describing or controlling properties of hardware components present at the receiving network node, including the temperature variation of a temperature controlled synchronization reference.

15. The device of claim 13, wherein the value of the at least one synchronization performance score is determined
(a) by using a predetermined scoring table defining a dependency between given values for the at least one synchronization performance score and the at least two synchronization quality describing or influencing parameters, and/or
(b) by using an analytical function using the at least two synchronization quality describing or influencing parameters as input parameters.

16. The device of claim 14, wherein the at least one synchronization performance score is chosen from a group of synchronization performance score types including the types of:
(a) network usability score in forward direction from the central time information distribution node to the receiving network node;
(b) network usability score in reverse direction from the receiving network node to the central time information distribution node;
(c) absolute or relative time recovery score;
(d) clock recovery score;
(e) frequency recovery score; and
(f) phase recovery score.

17. The device of claim 16, wherein the determination of a value of the network usability score in the forward direction and/or the network usability score in the reverse direction is based on at least two synchronization quality describing or influencing parameters of the group including:
- (a) network limits evaluation parameters;
- (b) packet delay variation metrics, including time deviation (TDEV), minimum time deviation (minTDEV), maximum average frequency error (MAFE), minimum maximum average frequency error (minMAFE); and
- (c) packet loss rate.

18. The device of claim 16, wherein the determination of a value of the frequency recovery score is based on at least two synchronization quality describing or influencing parameters of the group including:
- (a) the synchronization quality describing or influencing parameters of the group including (i) network limits evaluation parameters, (ii) packet delay variation metrics, including time deviation (TDEV), minimum time deviation (minTDEV), maximum average frequency error (MAFE), minimum maximum average frequency error (minMAFE), and (iii) packet loss rate, for determining the network usability score in one or both directions,
- (b) parameters describing or controlling properties of hardware components present at the receiving network node, including the temperature variation of a temperature controlled synchronization reference,
- (c) maximum time interval error (MTIE) with respect to a synchronization reference present at the probing point, and
- (d) measured fractional frequency offset (FFO) or measured phase offset with respect to a synchronization reference present at the probing point.

* * * * *